(12) United States Patent
Mirho

(10) Patent No.: US 10,732,815 B1
(45) Date of Patent: Aug. 4, 2020

(54) SYSTEM AND METHOD FOR MAPPING FLOW CHART PROCESS DESCRIPTIONS TO SYSTEM DIAGRAM ELEMENTS THROUGH A GRAPHICAL USER INTERFACE

(71) Applicant: TurboPatent Inc., Seattle, WA (US)

(72) Inventor: Charles A Mirho, Lake Oswego, OR (US)

(73) Assignee: Rowan TELS Corp., Seattle, WA (US)

( * ) Notice: Subject to any disclaimer, the term of this patent is extended or adjusted under 35 U.S.C. 154(b) by 117 days.

(21) Appl. No.: 15/482,772

(22) Filed: Apr. 9, 2017

(51) Int. Cl.
| | |
|---|---|
| *G06F 3/048* | (2013.01) |
| *G06F 40/166* | (2020.01) |
| *G06F 3/0486* | (2013.01) |
| *G06F 3/0482* | (2013.01) |
| *G06F 9/451* | (2018.01) |

(52) U.S. Cl.
CPC .......... *G06F 3/0486* (2013.01); *G06F 3/0482* (2013.01); *G06F 9/451* (2018.02); *G06F 40/166* (2020.01)

(58) Field of Classification Search
CPC ......... G06F 3/048; G06F 9/451; G06F 40/166
See application file for complete search history.

(56) References Cited

U.S. PATENT DOCUMENTS

| | | |
|---|---|---|
| 10,020,996 B1 | 7/2018 | Protasov et al. |
| 2013/0031492 A1* | 1/2013 | Curtis ................... G06F 9/4843 715/762 |
| 2015/0193418 A1* | 7/2015 | Koska .................... H04L 67/10 715/223 |
| 2015/0278190 A1* | 10/2015 | Ohara .................... H04L 67/10 704/10 |
| 2016/0357282 A1 | 12/2016 | Block et al. |
| 2017/0277170 A1 | 9/2017 | Lee et al. |

* cited by examiner

*Primary Examiner* — Xuyang Xia
(74) *Attorney, Agent, or Firm* — Rowan TELS LLC

(57) ABSTRACT

A method of graphically mapping actions to actors may include displaying a first UI element containing system diagram representative of a system diagram and a second UI element containing a list of contextually related actions through a user interface; operating branch creation logic, in response to receiving a first selection input through the user interface; operating branch merge logic, in response to receiving a subsequent selection input through the user interface; rendering a chart element from an action/outcome text node branch, in a third window of the user interface through operation of the graphics processor; and/or linking at least two chart elements in the third window based, in part, on hierarchical ranking of the associated ranked action/outcome text node branches through operation of the graphics processor.

7 Claims, 16 Drawing Sheets

SYSTEM AND METHOD FOR MAPPING FLOW CHART PROCESS DESCRIPTIONS TO SYSTEM DIAGRAM ELEMENTS THROUGH A GRAPHICAL USER INTERFACE

BACKGROUND

System diagrams graphically illustrate an interaction map between the components and sub-components of a system. In the system diagram, interaction between a pair of components is represented through a linkage line connecting a pair of graphical elements representing the system components. The linkage line may provide indication to whether the interaction is directional or bi-directional between the pair of components. Although system diagrams illustrate component and sub-component interactions within a system, the nature of the interactions as well as their relation to a particular system process may not be easily conveyed. In many instances, the issue may stem from spatial restrictions within the diagram or complexity of the system. In order to effectively convey the nature of the interactions and relation within a system process, a flow chart diagram maybe provided to detail a process flow. While the aforementioned flow charts diagrams are inherently related to the system diagram, current practice is for a user to draft the flow chart and the system diagram separately.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
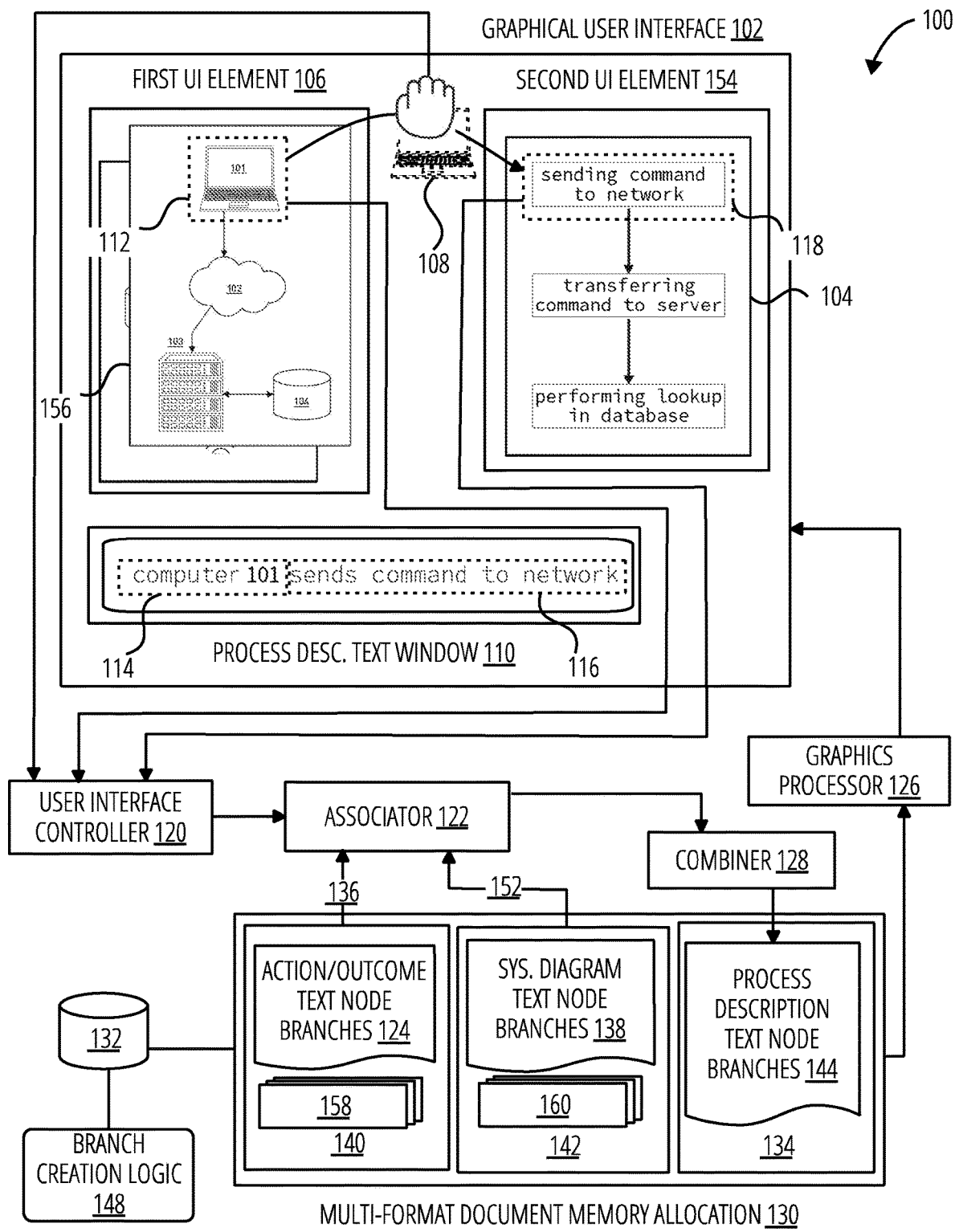
FIG. 1 illustrates an embodiment of a system for mapping flow chart process descriptions to system diagram graphics through a graphical user interface 100.

Certain terminology herein has the meanings set forth below, otherwise the meaning as commonly understood in the art should be used, unless otherwise indicated herein.

"action/outcome text node branch" in this context refers to a text node node organization representing a semantic description of an ordered process.

"associator" in this context refers to logic unit for establishing a level of commutativity between a data object/signal and at least another data object/signal.

"branch creation logic" in this context refers to logic for formatting and combining associated text node text to form a semantically modified text node branch.

"combiner" in this context refers to logic unit for combining signals and/or data into a new signal and/or data. For example, a combiner may read (a); read (b); write [(a)+(b)];

"controlled memory structure" in this context refers to organizational structure for storing and retrieving data.

"graphics processor" in this context refers to logic unit or microprocessor specialized for rendering graphics and/or processing images displayed through a user interface.

"memory controller" in this context refers to logic unit or digital circuit that manages the flow of data going to and from a computer's main memory or controlled memory structure.

"text node branch" in this context refers to a set of text nodes sharing a single parent node denoting common ancestry or origin.

"text node tree" in this context refers to a text data structure that assigns words and/or terms to a node position originating from a parent node and with dependencies as a child node.

"UI action control" in this context refers to logic control received by the user interface controller as an input or series of inputs for generating or displaying additional graphical objects in a UI element or within the graphical user interface.

"UI selection control" in this context refers to logic control received by the user interface controller as an input or series of inputs identifying a UI element or graphical object within a UI element displayed through the user interface "user interface controller" in this context refers to logic or digital circuit for translating input signals or a series of input signals received through a user interface into control signals denoting location, and/or a type of action to perform on a UI element or graphical object displayed through the user interface. For example, receive input(UI_locationValue); translate location(UI_locationValue)=selection(UI_firstObject); interpret input(selection(UI_firstObject).

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to or combined, without limiting the scope to the embodiments disclosed herein.

Various logic functional operations described herein may be implemented in logic that is referred to using a noun or noun phrase reflecting said operation or function. For example, an accumulation operation may be carried out by an "accumulator", selection may be carried out by a "selector", and so on.

"Associator" in this context refers to a correlator (see the definition for Correlator).

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Classifier" in this context refers to a specific type of correlator/associator logic that associates one or more inputs with a category, class, or other group sharing one or more common characteristics. An example of a classifier that may commonly be implemented in programmable hardware is a packet classifier used in network switches, firewalls, and routers (e.g., packet classifiers utilizing Ternary Content Addressable Memories). An example software or firmware classifier is: if (input1.value<12.5) input1.group=group1; else if (input1.value>=12.5 and input1.value<98.1) input1.group=group2; else input1.group=group3; Other examples of classifiers will be readily apparent to those of skill in the art, without undo experimentation.

"Correlator" in this context refers to a logic element that identifies a configured association between its inputs. One examples of a correlator is a lookup table (LUT) configured in software or firmware. Correlators may be implemented as relational databases. An example LUT correlator is: |low_alarm_condition|low_threshold_value|0||safe_ condition|safe_lower_bound|safe_upper_bound||high_alarm_ condition|high_threshold_value|0| Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/ or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

A method for mapping flow chart process descriptions to system diagram graphics through a graphical user interface (UI) involves operating a graphics processor to display a first UI element and a second UI element through the graphical user interface through operation of a graphics processor. A user interface controller is operated to receive a UI action control through the graphical user interface, receive a first UI selection control for a graphically displayed object in the first UI element, receive a second UI selection control for another graphically displayed object the second UI element, and configure an associator with the first UI selection control and the second UI selection control. The associator associates an action/outcome text node text in a flow chart memory allocation and a component name text node text in a system diagram memory allocation. A combiner generates a process description text node branch from the action/outcome text node text and the component name text node text in a process description memory allocation. The graphics processor displays the process description text node branch in a process description text window comprising a semantically modified action/outcome text node text and the component name text node text through operation of the graphics processor.

In some embodiments, associating the action/outcome text node text and the component name text node text through operation of the associator includes the action/outcome text node text being stored in an action/outcome text node branch for a flow chart diagram in the flow chart memory allocation and the component name text node text being stored in a system diagram text node branch for a system diagram in the system diagram memory allocation.

In some embodiments, generating the process description text node branch from the action/outcome text node text and the component name text node text in the process description memory allocation through operation of the combiner involves configuring the combiner with branch creation logic to transform the action/outcome text node text in into the semantically modified action/outcome text node text; and generate the process description text node branch from the component name text node text with the semantically modified action/outcome text node text in the process description memory allocation.

In some embodiments, operating the user interface controller involves receiving the first UI selection control for a system diagram graphic displayed in a system diagram in the first UI element, and receiving a drag and drop action control for the system diagram graphic and the second UI selection control for a displayed flow chart graphics object in the second UI element upon releasing the drag and drop action control.

In some embodiments, operating the user interface controller involves receiving the first UI selection control for a displayed flow chart graphics object in the second UI element, receiving the UI action control and populating a component name drop drown list with a list of component name text node text from system diagram text node branches in the first UI elements, and receiving the first UI selection control for a displayed component name in the component name drop drown list of the first UI element.

In some embodiments, operating the user interface controller involves receiving the first UI selection control for a flow chart graphics object displayed in a flow chart diagram in the second UI element, and receiving a drag and drop action control for the flow chart graphics object and the second UI selection control for a displayed system diagram element in the first UI element upon releasing the drag and drop action control.

In some embodiments, operating the user interface controller involves receiving the first UI selection control for a displayed system diagram element in the first UI element, receiving the UI action control and populating an action/outcome text drop down list with a list of action/outcome text node text from action/outcome text node branches in the second UI element, and receiving the second UI selection control for a displayed action/outcome text in the action/outcome text drop down list of the second UI element.

A user interface element may refer to a graphical representation of a document section (e.g., system diagrams, flow chart diagrams, written descriptions, etc.) displayed in the original format of the document (e.g., image, text, combination thereof, etc.) or a graphical control element displaying constituent elements (i.e., text descriptions, graphic objections, and combinations thereof) of a document section in a drop-down list, grid view, etc.

In some embodiments, the user interface element includes graphically displayed objects. The graphically displayed objects are constituent elements of a document section (e.g., system diagrams, flow chart diagrams, written descriptions, etc.) displayed through the user interface element. The graphically displayed objects may display text, a graphic, or combinations thereof. In some instance the graphically displayed objects may display a graphic associated with a stored text description visible in a separated section of a multi-format document.

A flow chart diagram may include a plurality of interconnected flow chart graphic objects representing a process flow. The flow chart graphic includes an action/outcome text description that may be enclosed with a graphical object (e.g., polygon, line, etc.) with a line linking the graphical object to at least one other graphical object. The leading line indicates the directionality of an ordered process.

In some embodiments, an action/outcome text drop down list may be displayed as a user interface element for a flow chart diagram. The action/outcome drop down list displays a list of action/outcome text node text from action/outcome text node branches in a flow chart diagram memory allocation in a multi-format document memory allocation. The list of action/outcome text may represent at least one flow chart diagram and may be selected through a UI selection control. In some embodiments, at least one displayed action/outcome text may be selected in the list of action/outcome text in the drop-down list.

A system diagram is an image of a representative system displaying components, relational positioning, and/or interactivity between components of representative system. The system diagram may be represented by a set of interconnected graphical objects, where each graphical object may be an image of a system component (e.g., server, processor, etc.) connected to another graphical object representing an interaction between components. In some embodiments, a system diagram includes a plurality of graphical objects each comprising a component name stored as a component name text node text in a system diagram text node branch and displayed with an associated system diagram graphic in a system diagram graphic library. In some embodiments, the system diagram may display a system diagram graphic and a reference number. The component name may for the system may be displayed in a different section of the multi-format document with the reference number appended or prepended to the component name.

In some embodiments, components of a system diagram may be represented in a component name drop drown list. The component name drop down list displays a list of component names from the component name text node text stored in a component name text node branches in the system diagram memory allocation. The displayed component names in the drop-down list may be selected through a UI selection control.

A user interface controller refers to logic or digital circuit for translating input signals or a series of input signals received through a user interface into control signals denoting location, and/or a type of action to perform on a UI element or graphical object displayed through the user interface. For example, receive input(UI_locationvalue); translate location(UI_locationvalue)=selection(UI_firstobject); interpret input(selection(UI_firstobject).

A UI selection control refers to a logic control received by the user interface controller identifying a UI element or graphical object within a UI element displayed through the user interface. A UI action control refers to a logic control received by the user interface controller as an input or series of inputs for generating or displaying additional graphical objects in a UI element or within the graphical user interface. In some embodiments, the UI action control may be a drag and drop action control where a graphical object is selected and moved around within the user interface until the selection is released. The drag and drop action control may select two graphical objects together on separate UI elements.

A multi-format document memory allocation refers to a memory allocation within a controlled memory data structure storing component sections of a multi-format document are stored. A multi-format document includes a system diagram memory allocation, a flow chart diagram memory allocation, and a process description memory allocation.

A process description memory allocation of memory in the multi-format document memory allocation of a controlled memory data structure storing the process description text node branches generated from a component name text node text and an action/outcome text node text. In some embodiments, the action/outcome text node text may be semantically modified during combination of the action/outcome text node text and the component name text node text as configured by the branch creation logic.

A process description text node branch refers to at least one combination of the component name text node text and the action/outcome text node text stored in the process description memory allocation. A process description text window refers to a UI element in the user interface displaying a process description generated from the selection of a system diagram object and a flow chart diagram object. The process description text window displays a process description text node branch as a combination of the component name text node text and the semantically modified text node text.

The semantically modified action/outcome text node text refers to the description of an ordered process associated with a named component of a system diagram where the description of the ordered process is formatted to convey that the ordered process is performed by the named component.

A system diagram memory allocation refers to a location within the multi-format memory allocation in the controlled memory data structure storing a system diagram text node branches and system diagram graphic library. The system diagram text node branches are text storage structure for component names of system diagram components. The system diagram text node branches may represent the storage of at least on system diagram. The component name of the system diagram components are stored as component name text node text within the system diagram text node branches. In some embodiments, each component name text node text is associated with a system diagram graphic displayed. The system diagram graphic is an image or graphics instructions for generating a graphical object when the system diagram is displayed in the UI element. Each system diagram graphic may be stored within a system diagram graphic library and utilized by the graphics processor to generate the system diagram.

A flow chart memory allocation refers to a location within the multi-format memory allocation it he controlled memory data structure storing action/outcome text node branches and a flow chart element graphic library. The action/outcome text node branches are the text storage structure for organizing ordered process descriptions for at least one flow chart diagram. The ordered process descriptions are stored as action/outcome text node text. In some embodiments, each action/outcome text node text may be associated with a flow chart element graphic stored in a flow chart element graphic library. Flow chart element graphics may be images or graphical instruction for generating a graphic object the flow chart object is displayed in a UI element. The flow chart element graphics may be displayed as simple polygons enclosing action/outcome text in the flow chart diagram. Each flow chart graphic is linked to at least one other flow chart graphic. The link establishes a progression between the ordered process described in the action/outcome text node in the flow chart graphic.

In some embodiments, a method of graphically mapping actions to actors may include displaying a first UI element comprising system diagram representative of a system diagram and a second UI element comprising a list of contextually related actions through a user interface; operating branch creation logic, in response to receiving a first selection input through the user interface; operating branch merge logic, in response to receiving a subsequent selection input through the user interface; rendering a chart element from an action/outcome text node branch, in a third window of the user interface through operation of the graphics processor; and/or linking at least two chart elements in the third window based, in part, on hierarchical ranking of the associated ranked action/outcome text node branches through operation of the graphics processor.

In some embodiments, operation of the branch creation logic includes associating a first action text node from the list of contextually related actions with a first graphical object in the first UI element through control of an associator; appending object identifier text node of the first graphical object and the first action text node in a first text node branch of a text node tree, in a controlled memory structure, through control of a memory controller; and/or identifying and graphically differentiating linked system diagram elements with ingressing links from the first graphical object in the first UI element through control of a graphics processor.

In some embodiments, operation of the branch merge logic includes associating a second action text node from the list of contextually related actions with at least one linked graphical object in the first UI element through control of the associator; appending the object identifier text node of the at least one linked graphical object and the second action text node in a second text node branch of the text node tree, stored in the controlled memory structure, through control of the memory controller; and/or combining the first text node branch with the second text node branch generating a hierarchically ranked action/outcome text node branch in the text node tree through control of a combiner.

In some embodiments, the action/outcome text node text in the list of contextually related actions is populated, at least in part, by semantic analysis of component name text node text of the system diagram.

In some embodiments, the action/outcome text node text in the list of contextually related actions is regenerated following operation of the branch creation logic and populated, at least in part, by semantic analysis of the first text node branch and component name text node text of the linked system diagram elements.

In some embodiments, displaying the system diagram in the first UI element includes operating image processing logic, in response to receiving a system diagram image through an input channel of the user interface, to: identify distinct graphical objects distributed throughout the system diagram image; determine component name text node text based, in part, on geometric features of the distinct graphical objects and recognizable text label; and/or identify the linked system diagram elements based, in part, on terminus location of link line paths.

Referencing FIG. 1, a system for mapping flow chart process descriptions to system diagram graphics through a graphical user interface 100 comprises a graphical user interface 102 comprising a first UI element 106, a second UI element 154, and a process description text window 110, a user interface controller 120, an associator 122, a graphics processor 126, a combiner 128, and a controlled memory data structure 132 comprising a multi-format document memory allocation 130. The first UI element 106 displays a system diagram 156 and a selected displayed system diagram graphic 112. The second UI element 154 displays a flow chart diagram 104 and a selected displayed flow chart graphics object 118. The process description text window 110 displays a component name text node text 114 and a semantically modified action/outcome text node text 116. The graphical user interface 102 displays a drag/drop input 108. The multi-format document memory allocation 130 comprises a flow chart memory allocation 140 comprising an action/outcome text node branches 124 and a flow chart memory allocation 140, a system diagram memory allocation 142 comprising a system diagram text node branches 138 and a system diagram element graphic library 160, and a process description memory allocation 134 comprising a process description text node branches 144. The controlled memory data structure 132 comprises a branch creation logic 148.

Figure 2:
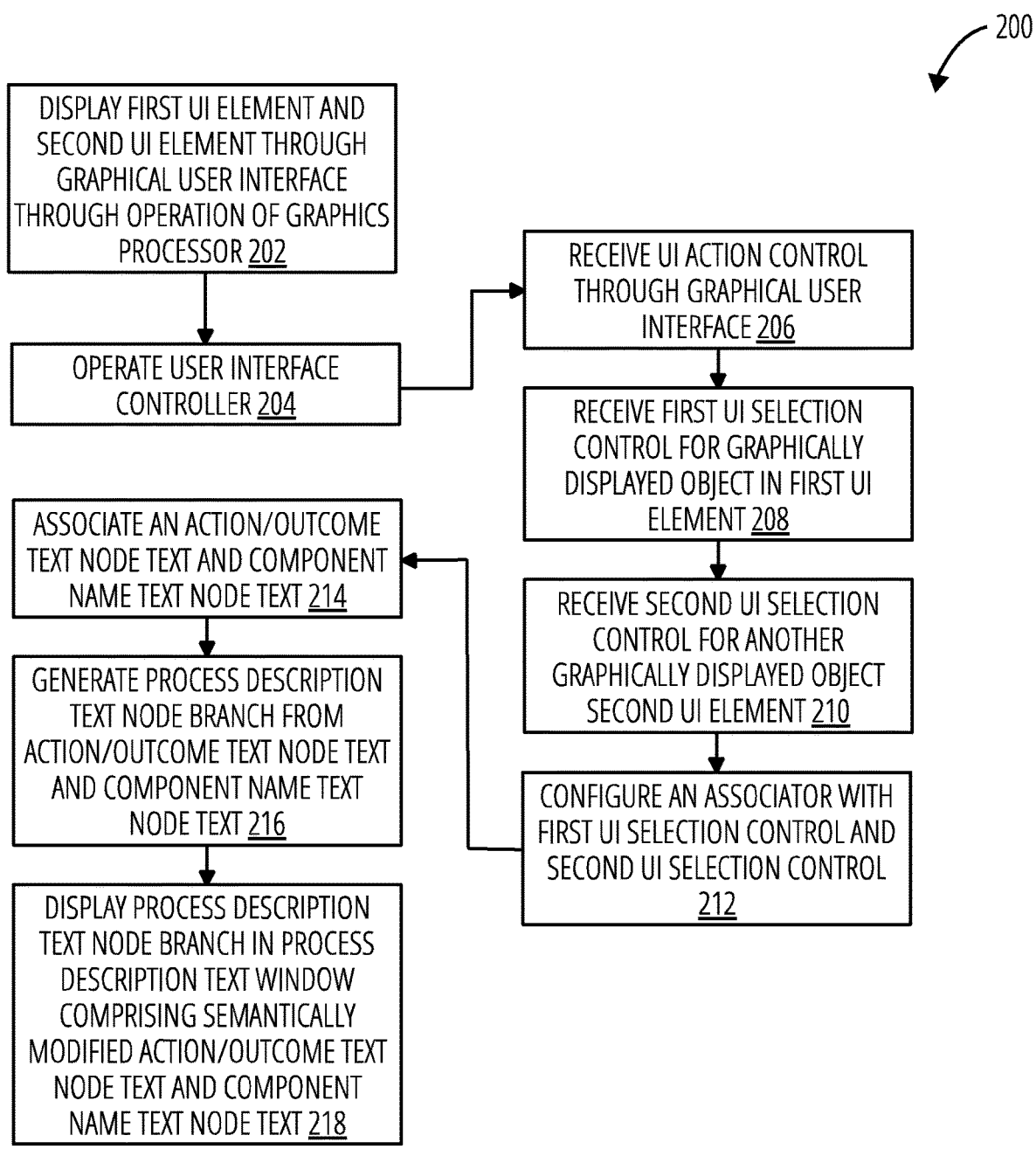
FIG. 2 illustrates an embodiment of a method for mapping flow chart process descriptions to system diagram graphics through a graphical user interface 200.
Figure 4:
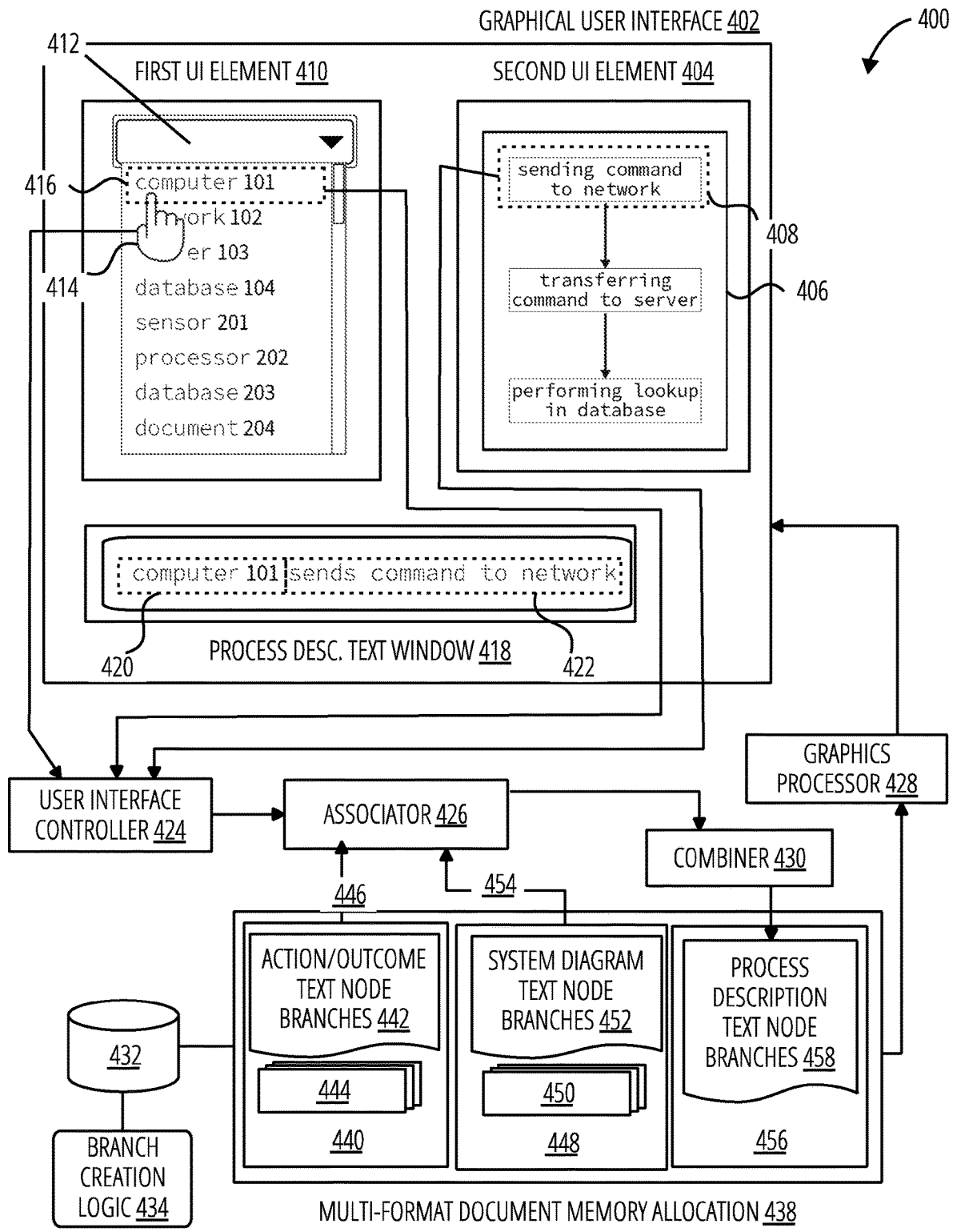
FIG. 4 illustrates an embodiment of a system for mapping flow chart process descriptions to system diagram elements through a graphical user interface 400.

The system for mapping flow chart process descriptions to system diagram graphics through a graphical user interface 100 may be operated in accordance with the process described in FIG. 2 and FIG. 4.

Referencing FIG. 2, a method for mapping flow chart process descriptions to system diagram graphics through a graphical user interface 200 displays a first UI element and a second UI element through the graphical user interface through operation of a graphics processor (block 202). In block 204, a user interface controller is operated. The user interface controller receives a UI action control through the graphical user interface (block 206). The user interface controller receives a first UI selection control for a graphically displayed object in the first UI element (block 208). The user interface controller receives a second UI selection control for another graphically displayed object the second UI element (block 210). The user interface controller configures an associator with the first UI selection control and the second UI selection control (block 212). The associator associates an action/outcome text node text in a flow chart memory allocation and a component name text node text in a system diagram memory allocation (block 214). A combiner generates a process description text node branch from the action/outcome text node text and the component name text node text in a process description memory allocation (block 216). The graphics processor displays the process description text node branch in a process description text window comprising a semantically modified action/outcome text node text and the component name text node text (block 218).

Figure 3:
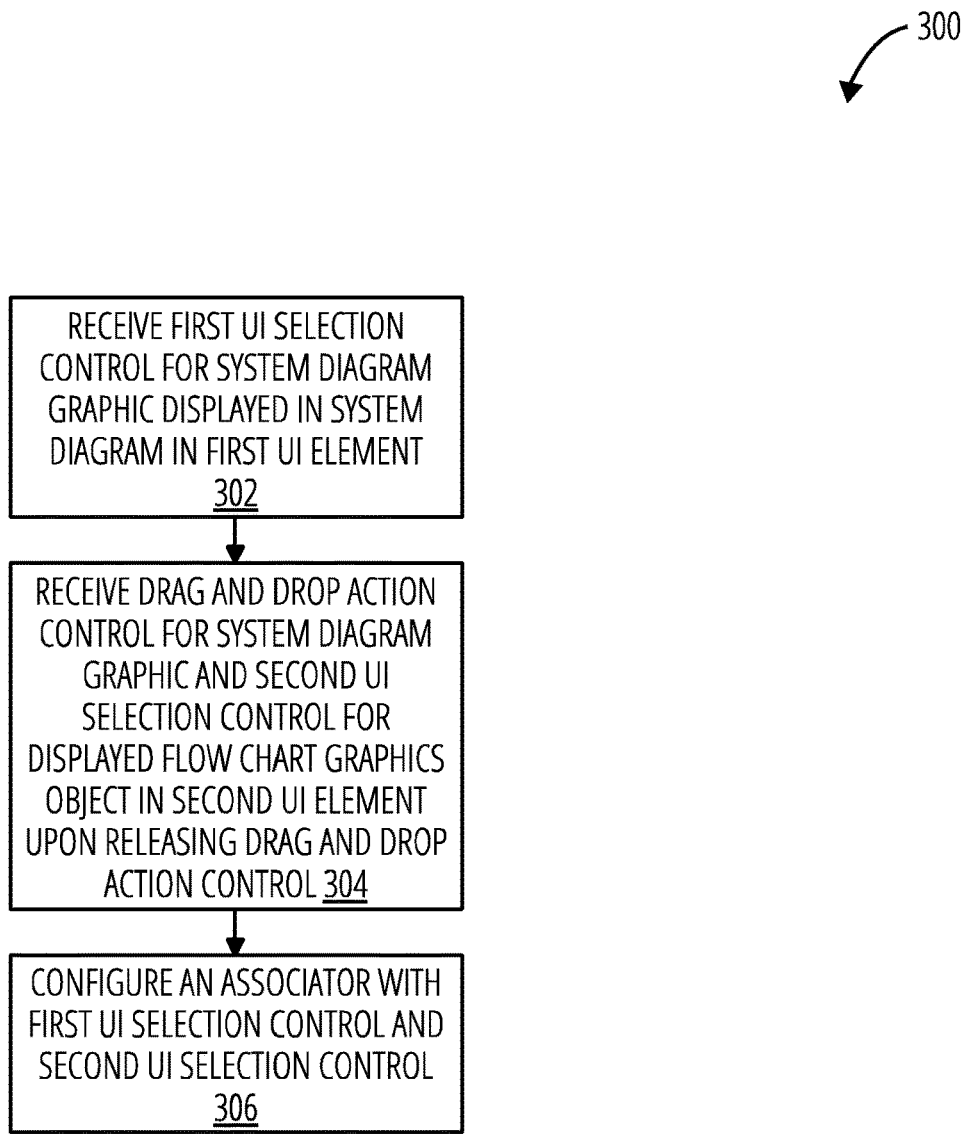
FIG. 3 illustrates an embodiment of an operation of a user interface controller 300.

Referencing FIG. 3, an operation of a user interface controller 300 receives the first UI selection control for a system diagram graphic displayed in a system diagram in the first UI element (block 302). In block 304, the operation of a user interface controller 300 receives a drag and drop action control for the system diagram graphic and the second UI selection control for a displayed flow chart graphics object in the second UI element upon releasing the drag and drop action control. In block 306, the operation of a user interface controller 300 configures an associator with the first UI selection control and the second UI selection control.

The system for mapping flow chart process descriptions to system diagram elements through a graphical user interface 400 comprises a graphical user interface 402 comprising a second UI element 404, a first UI element 410, and a process description text window 418, a user interface controller 424, an associator 426, a graphics processor 428, a combiner 430, a controlled memory data structure 432, The first UI element 410, a component name drop down list 412, a first UI selection control 414, a selected component name text node text 416, The second UI element 404 comprises a flow chart diagram 406, a selected displayed flow chart graphics object 408.

The process description text window 418 comprises a component name text node text 420, a semantically modified action/outcome text node text 422

The controlled memory data structure 432, comprises branch creation logic 434 and a multi-format document memory allocation 438.

The multi-format document memory allocation 438 comprises a flow chart memory allocation 440, comprising an action/outcome text node branches 442, a flow chart graphics object graphic library 444, an action/outcome text node text 446; a system diagram memory allocation 448 comprising a system diagram element graphic library 450, a system diagram text node branches 452, a component name text node text 454, and a process description memory allocation 456 comprising a process description text node branches 458.

Figure 5:
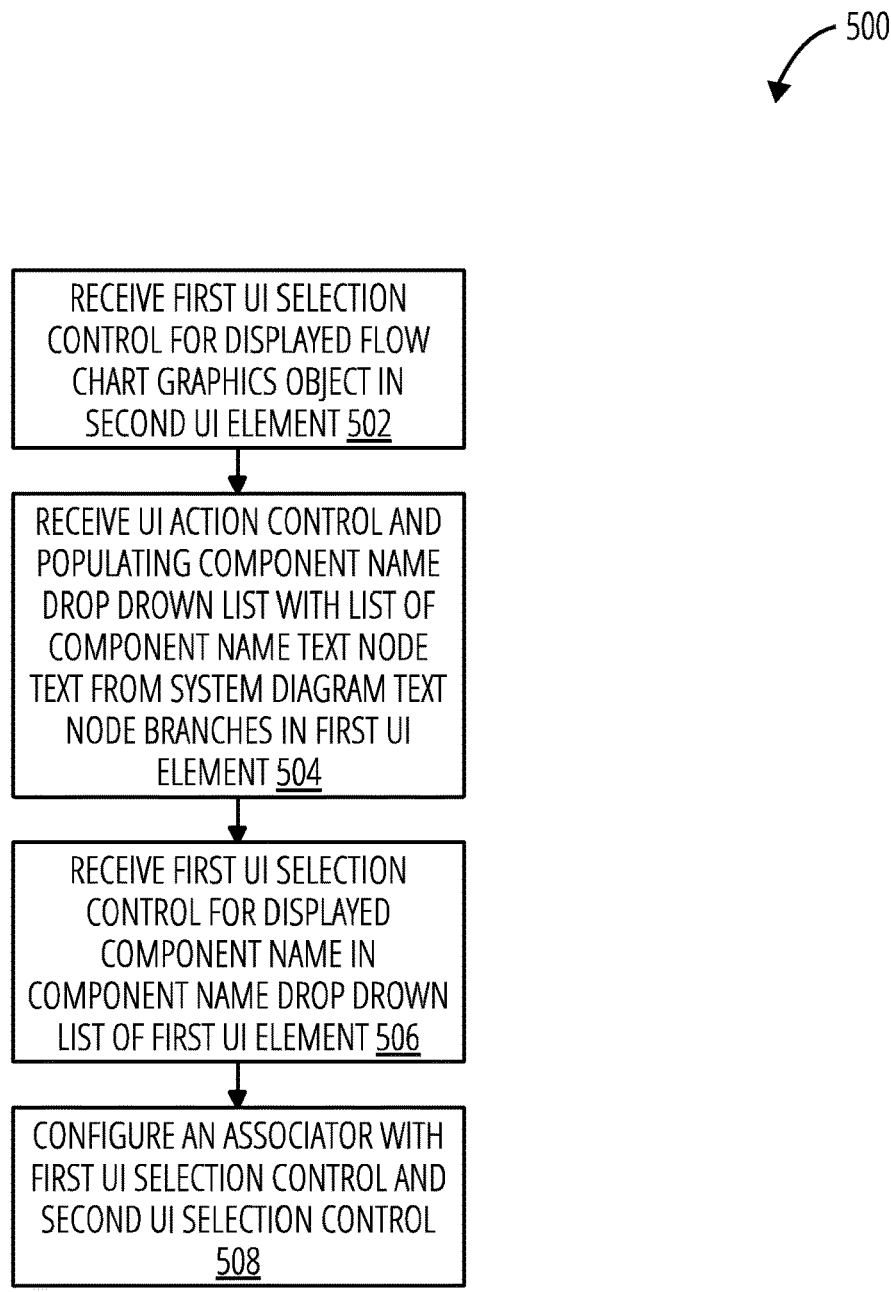
FIG. 5 illustrates an embodiment of an operation of a user interface controller 500.

The system for mapping flow chart process descriptions to system diagram elements through a graphical user interface 400 may be operated in accordance with the process described in FIG. 2 and FIG. 5.

Referencing FIG. 5, an operation of a user interface controller 500 receives the first UI selection control for a displayed flow chart graphics object in the second UI element (block 502). In block 504, the operation of a user interface controller 500 receives the UI action control and populating a component name drop drown list with a list of component name text node text from system diagram text node branches in the first UI element. In block 506, the operation of a user interface controller 500 receives the first UI selection control for a displayed component name in the component name drop drown list of the first UI element. In block 508, the operation of a user interface controller 500 configures an associator with the first UI selection control and the second UI selection control.

Figure 6:
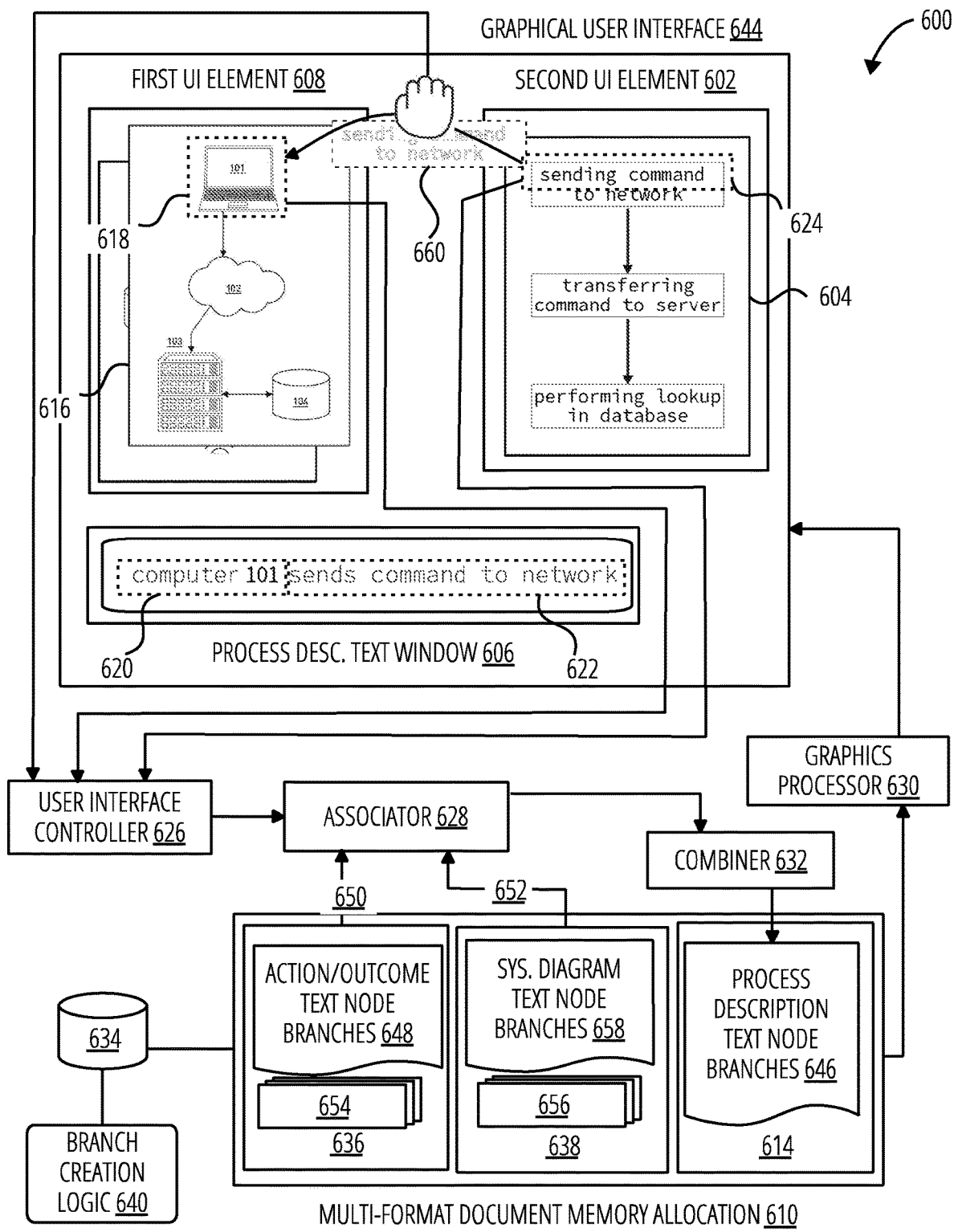
FIG. 6 illustrates an embodiment of a system for mapping flow chart process descriptions to system diagram graphics through a graphical user interface 600.

Referencing FIG. 6, a system for mapping flow chart process descriptions to system diagram graphics through a graphical user interface 600 comprises a graphical user interface 644 comprising a first UI element 608, a second UI element 602, and a process description text window 606, a user interface controller 626, an associator 628, a graphics processor 630, a combiner 632, and a controlled memory data structure 634 comprising a multi-format document memory allocation 610. The first UI element 608 displays a system diagram 616 and a selected displayed system diagram graphic 618. The second UI element 602 displays a flow chart diagram 604 and a selected displayed flow chart graphics object 624. The process description text window 606 displays a component name text node text 620 and a semantically modified action/outcome text node text 622. The graphical user interface 644 displays a drag and drop input 660. The multi-format document memory allocation 610 comprises a flow chart memory allocation 636 comprising an action/outcome text node branches 648 and a flow chart memory allocation 636, a system diagram memory allocation 638 comprising a system diagram text node branches 658 and a system diagram element graphic library 656, and a process description memory allocation 614 comprising a process description text node branches 646. The controlled memory data structure 634 comprises a branch creation logic 640.

Figure 7:
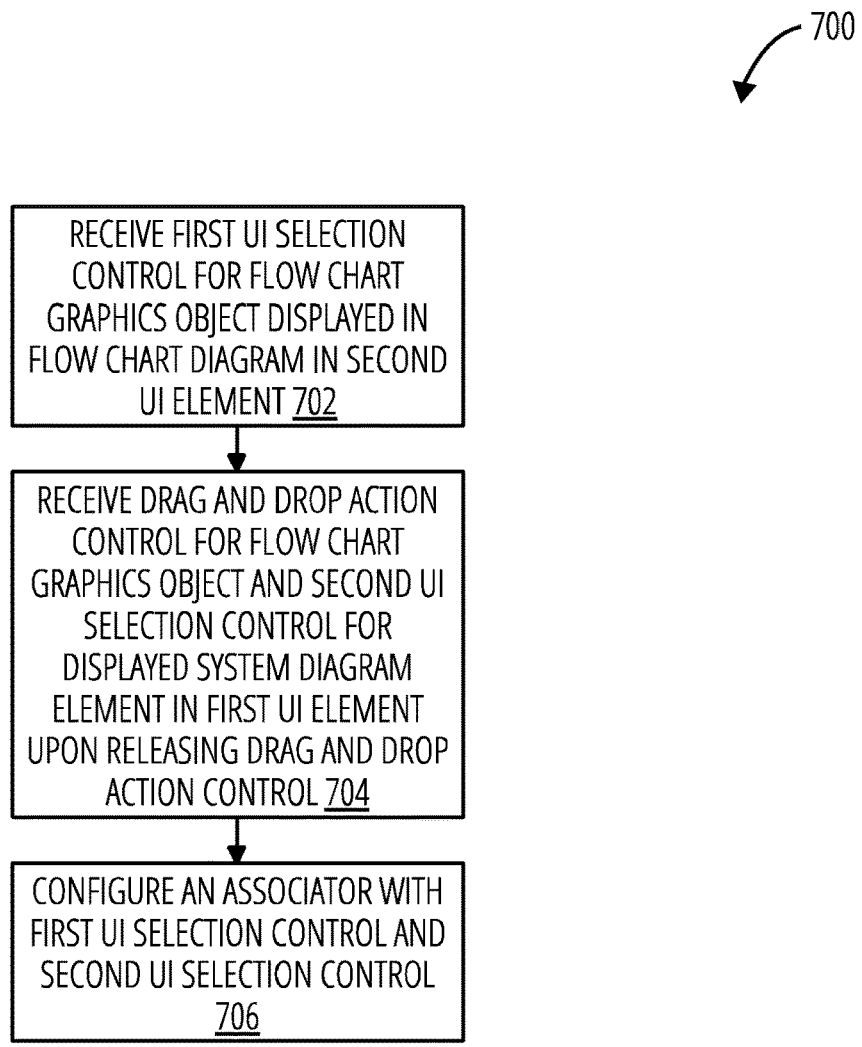
FIG. 7 illustrates an of an operation of a user interface controller 700.

The system for mapping flow chart process descriptions to system diagram graphics through a graphical user interface 600 may be operated in accordance with the process described in FIG. 2 and FIG. 7.

Referencing FIG. 7, an operation of a user interface controller 700 receives the first UI selection control for a flow chart graphics object displayed in a flow chart diagram in the second UI element (block 702). In block 704, the operation of a user interface controller 700 receives a drag and drop action control for the flow chart graphics object and the second UI selection control for a displayed system diagram element in the first UI element upon releasing the drag and drop action control. In block 706, the operation of a user interface controller 700 configures an associator with the first UI selection control and the second UI selection control.

Figure 8:
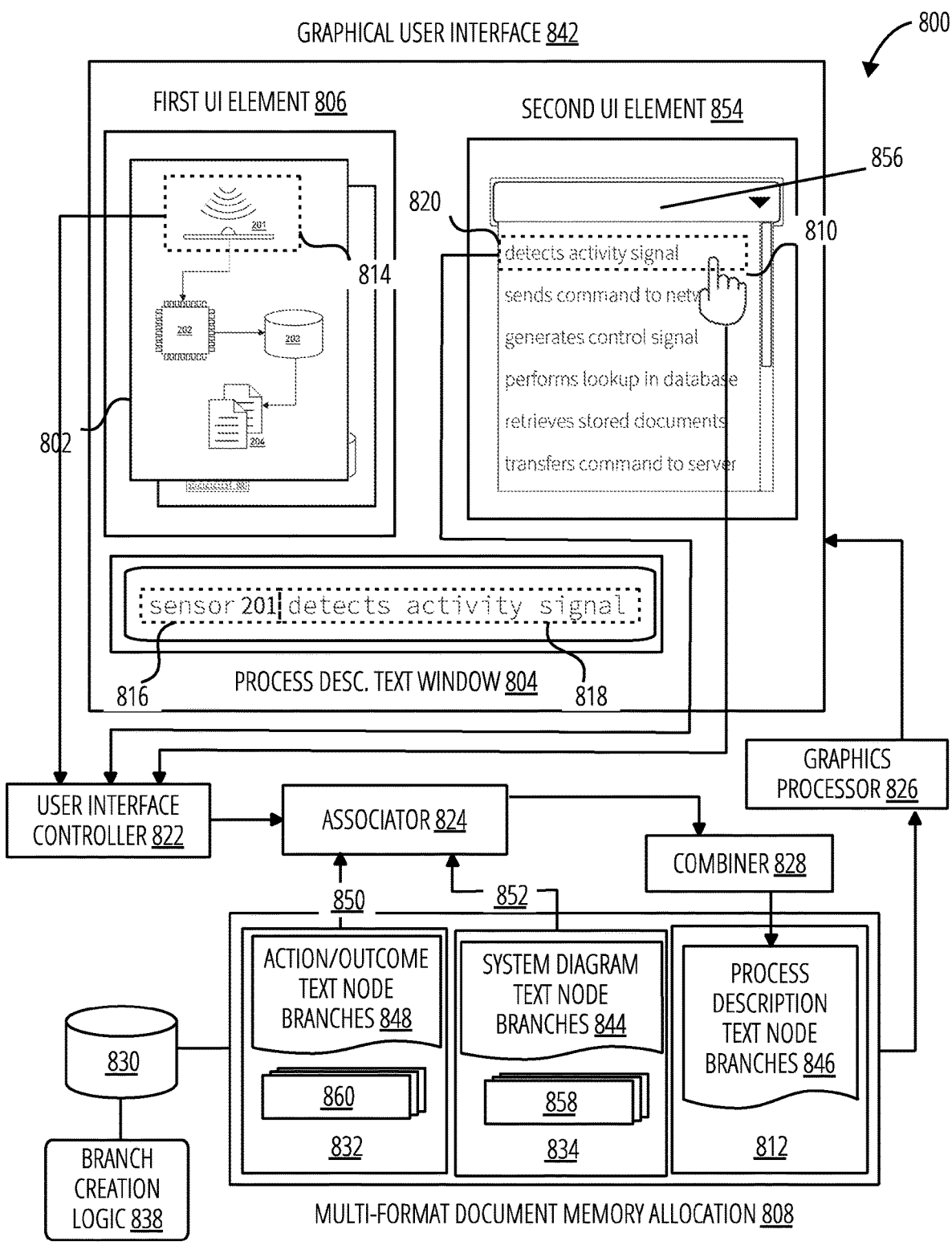
FIG. 8 illustrates an embodiment of a system for mapping flow chart process descriptions to system diagram graphics through a graphical user interface 800.

Referencing FIG. 8, a system for mapping flow chart process descriptions to system diagram graphics through a graphical user interface 800 comprises a graphical user interface 842 comprising a first UI element 806, a system diagram text node branches 844, and a process description text window 804, a user interface controller 822, an associator 824, a combiner 828, a graphics processor 826, and a controlled memory data structure 830. The first UI element 806 displays a system diagram 802 and a selected displayed system diagram graphic 814. The second UI element 854 displays an action/outcome text drop down list 856, a selected displayed action/outcome text node text 820, and a selection input 810. The process description text window 804 displays a component name text node text 816 and a semantically modified action/outcome text node text 818. The controlled memory data structure 830 comprises a branch creation logic 838 and a multi-format document memory allocation 808.

The multi-format document memory allocation 808 comprises a flow chart memory allocation 832 comprising a flow chart graphics object graphic library 860 and an action/outcome text node branches 848 comprising an action/outcome text node text text 850, a system diagram memory allocation 834 comprising a system diagram element graphic library 858 and a system diagram text node branches 844 comprising component name text node text text 852, the process description memory allocation 812 comprises a process description text node branches 846.

Figure 9:
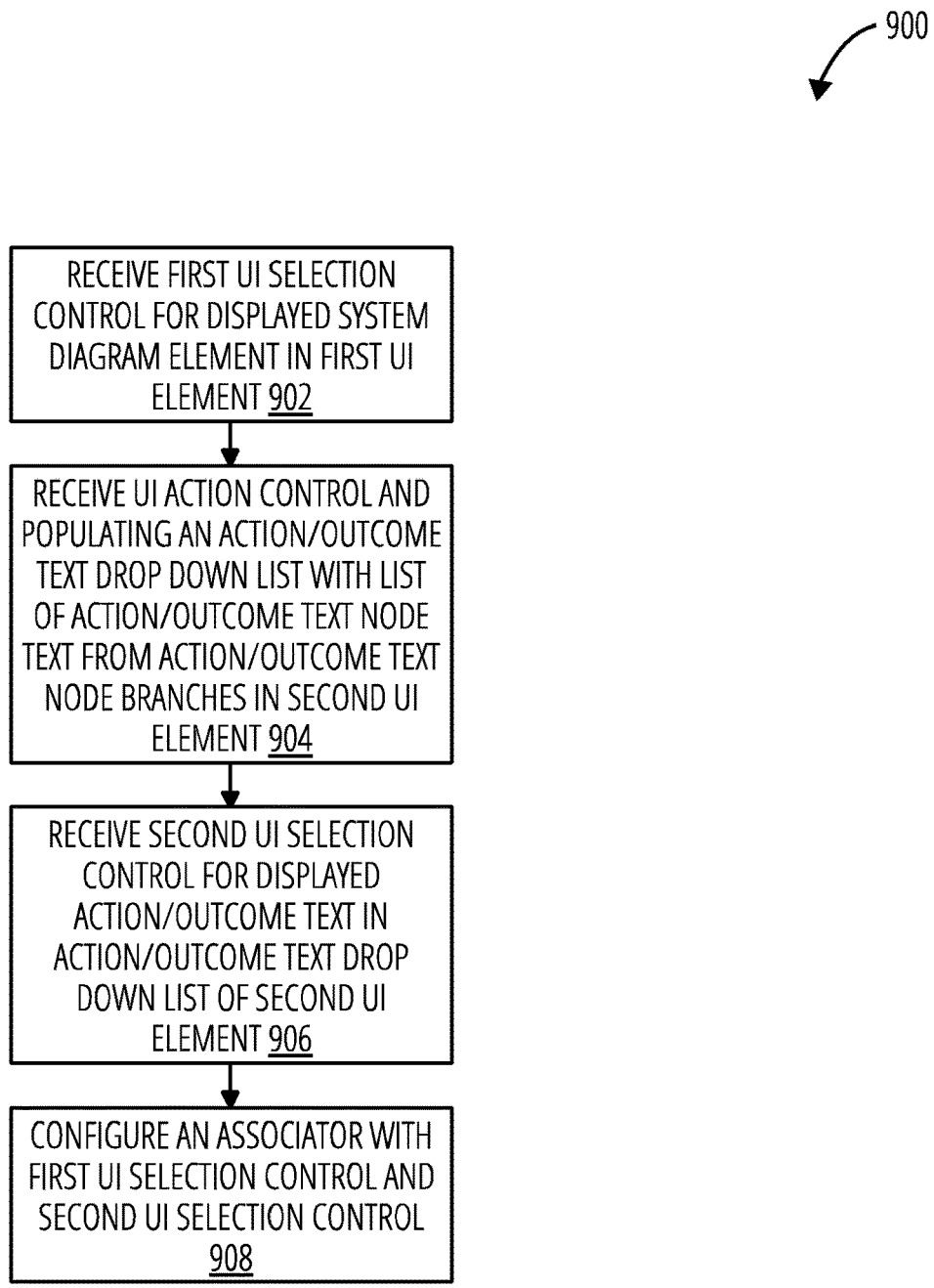
FIG. 9 illustrates an embodiment of an operation of a user interface controller 900.

The system for mapping flow chart process descriptions to system diagram graphics through a graphical user interface 800 may be operated in accordance with the process described in FIG. 2 and FIG. 9.

Referencing FIG. 9, an operation of a user interface controller 900 receives the first UI selection control for a displayed system diagram element in the first UI element (block 902). In block 904, an operation of a user interface controller 900 receives the UI action control and populating an action/outcome text drop down list with a list of action/outcome text node text from action/outcome text node branches in the second UI element. In block 906, an operation of a user interface controller 900 receives the second UI selection control for a displayed action/outcome text in the action/outcome text drop down list of the second UI element. In block 908, the operation of a user interface controller 900 configures an associator with the first UI selection control and the second UI selection control.

Figure 10:
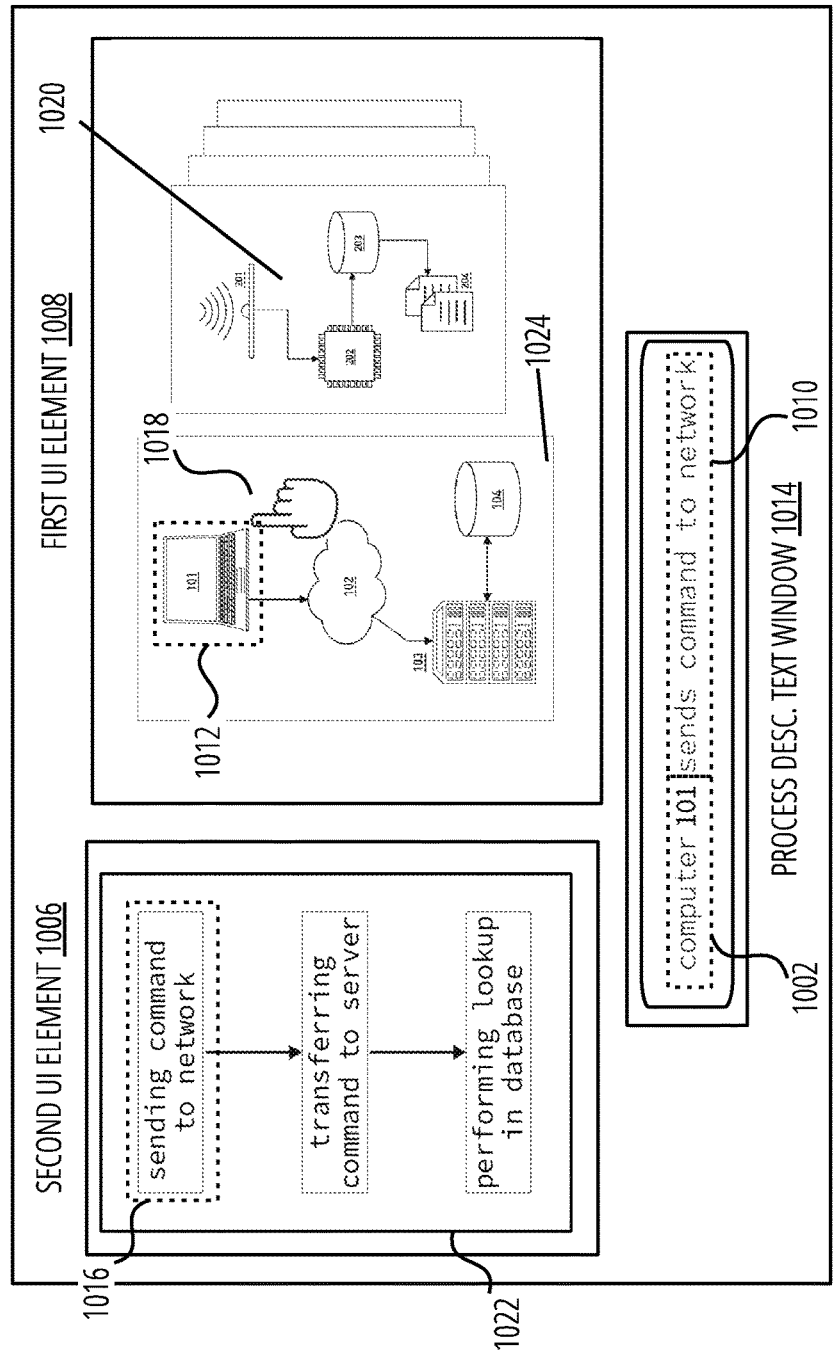
FIG. 10 illustrates an embodiment of a system for mapping flow chart process descriptions to system diagram graphics through a graphical user interface 1000.

Referencing FIG. 10, a system for mapping flow chart process descriptions to system diagram graphics through a graphical user interface 1000 comprises a first UI element 1008, a second UI element 1006, and a process description text window 1014. The second UI element 1006 comprises a flow chart diagram 1022 and a selected displayed flow chart graphics object 1016. The first UI element 1008 comprises a system diagram 1024, stacked system diagrams 1020, a selected displayed system diagram graphic 1012, and a first UI selection control 1018. The process description text window 1014 comprises a component name text node text 1002 and a semantically modified action/outcome text node text 1010.

The system for mapping flow chart process descriptions to system diagram graphics through a graphical user interface 1000 illustrates an embodiment of a graphical user interface 1004 where a first UI element 1008 displays a system diagram 1024 in focus while showing the first system diagram of stacked system diagrams 1020 as part of a card stack layout. The configuration permits visibility of at least two system diagrams at the same time.

The system for mapping flow chart process descriptions to system diagram graphics through a graphical user interface 1000 may be operated in accordance to the process described in FIG. 2.

Figure 11:
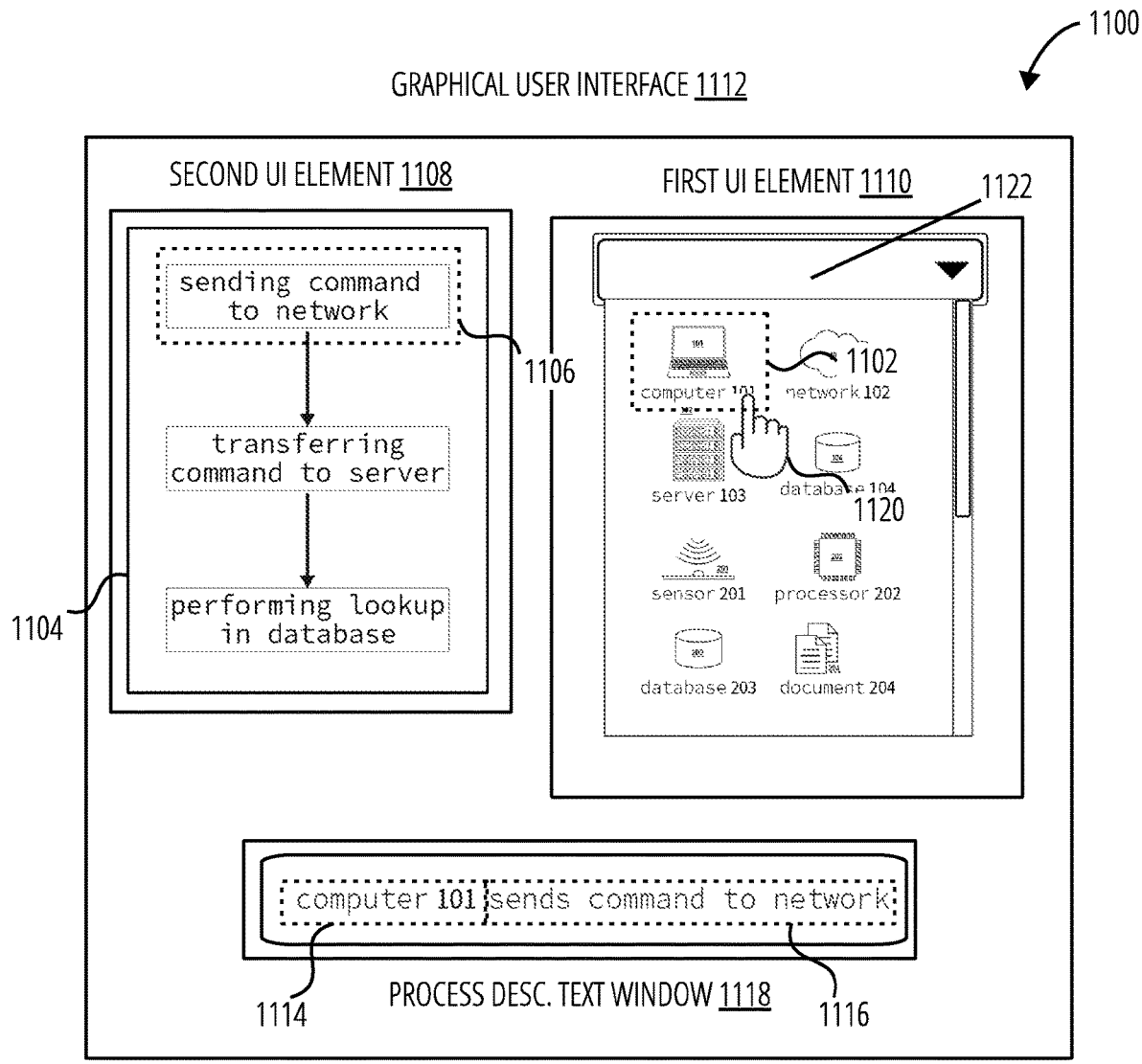
FIG. 11 illustrates an embodiment of a system for mapping flow chart process descriptions to system diagram graphics through a graphical user interface 1100.

Referencing FIG. 11 a system for mapping flow chart process descriptions to system diagram graphics through a graphical user interface 1100 comprises a graphical user interface 1112, a flow chart diagram 1108, a first UI element 1110, and a process description text window 1118. The flow chart diagram 1108 comprises a flow chart diagram 1104 and displays a selected displayed flow chart graphics object 1106. The first UI element 1110 comprises a graphical component name drop down list 1122 displaying a selected displayed system diagram graphic 1102 and a UI action control 1120. The process description text window 1118 comprises a component name text node text 1114 and a semantically modified action/outcome text node text 1116.

The system for mapping flow chart process descriptions to system diagram graphics through a graphical user interface 1100 illustrates an embodiment of a graphical user interface 1112 displaying a graphical component name drop down list 1122 as a first UI element 1110. The graphical component name drop down list 1122 is similar to the a drop-down list for displaying component names but additionally provides the associated system diagram graphic with the component name. In some embodiments, the drop-down list may be sorted by groups based, in part, on their containing system diagram.

The system for mapping flow chart process descriptions to system diagram graphics through a graphical user interface 1100 may be operated in accordance with the process described in FIG. 2.

Figure 12:
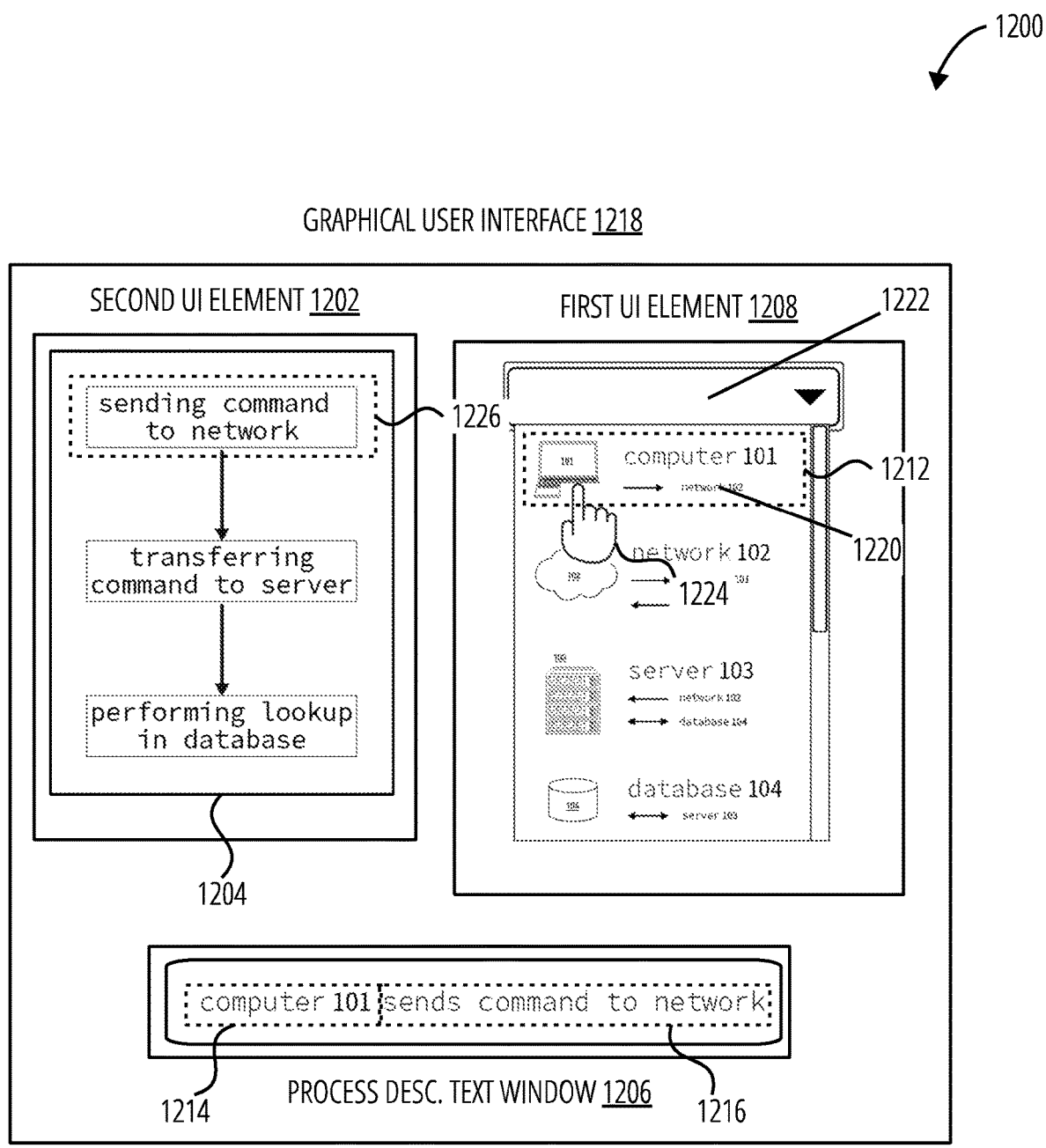
FIG. 12 illustrates an embodiment of a system for mapping flow chart process descriptions to system diagram graphics through a graphical user interface 1200.

Referencing FIG. 12, a system for mapping flow chart process descriptions to system diagram graphics through a graphical user interface 1200 comprises a second UI element 1202, a first UI element 1208, and a process description text window 1206. The second UI element 1202 comprises a flow chart diagram 1204 and displays a selected displayed flow chart graphics object 1226. The first UI element 1208 comprises a graphical component name drop down list 1222, a selected displayed system diagram component name and graphic 1212 linked graphical element 1220, and a UI action control 1224. The process description text window 1206 comprises a component name text node text 1214 and selected displayed flow chart graphics object 1226.

The system for mapping flow chart process descriptions to system diagram graphics through a graphical user interface 1200 illustrates an embodiment of a graphical user interface 1218 displaying a graphical component name drop down list 1222 in the first UI element 1208. The graphical component name drop down list 1222 displays a list of component name text node text additionally displaying their associated system diagram graphic. Furthermore, displayed component names with system diagram graphic display a linked graphical element 1220 showing a connection between the system diagram graphic with another component within the system diagram.

The system for mapping flow chart process descriptions to system diagram graphics through a graphical user interface 1200 may be operated in accordance with the process described in FIG. 2.

Figure 13:
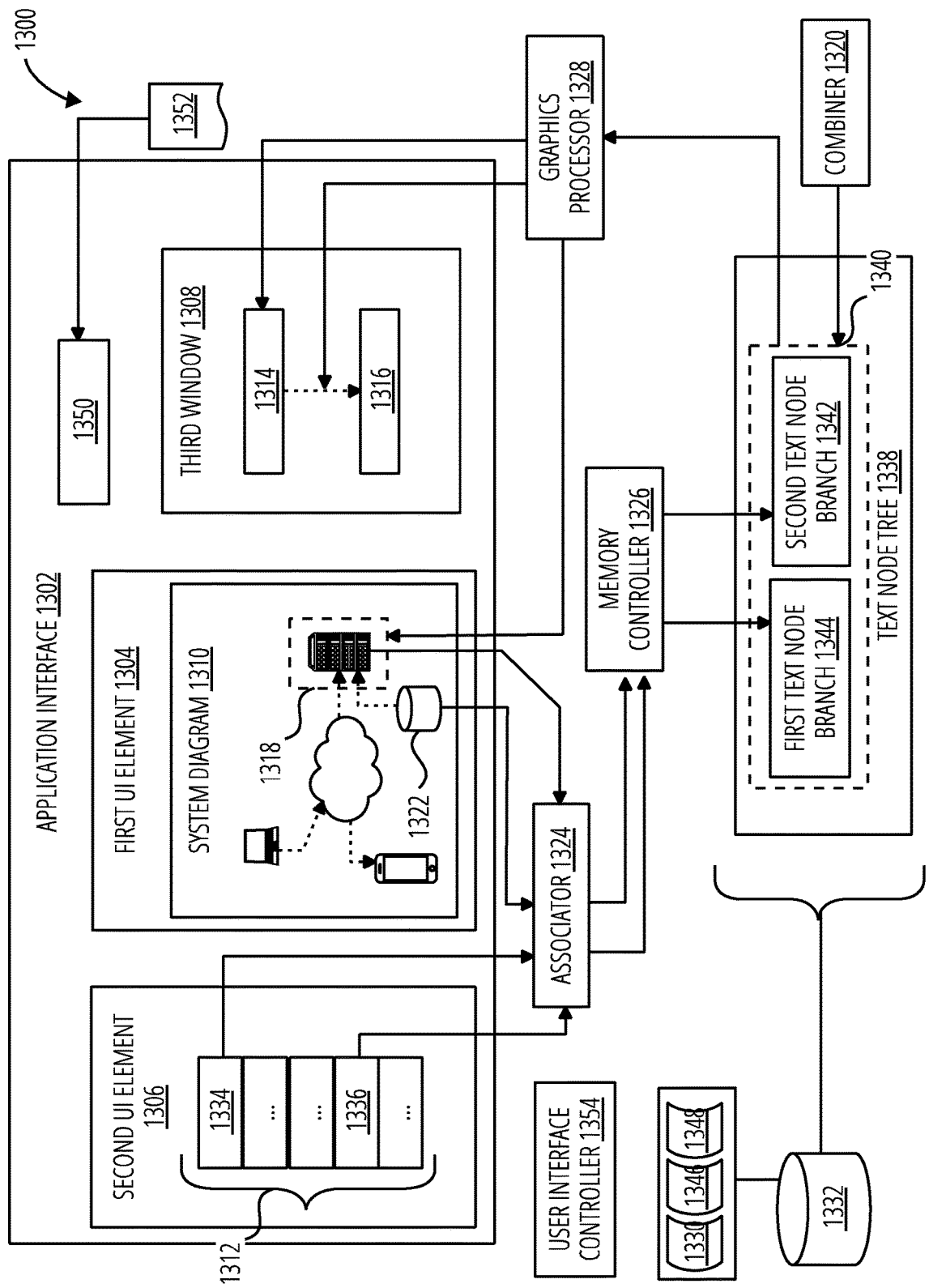
FIG. 13 illustrates an embodiment of a system for mapping actions to actors through a graphical user interface 1300.

FIG. 13 illustrates an embodiment of a system for mapping actions to actors through a graphical user interface 1300. The system for mapping actions to actors through a graphical user interface 1300 comprises an application interface 1302, a controlled memory structure 1332, an associator 1324, a memory controller 1326, a graphics processor 1328, user interface controller 1354, and a combiner 1320. The application interface 1302 comprises a first UI element 1304, a second UI element 1306, a third window 1308, and an input channel 1350. The first UI element 1304 includes a system diagram 1310 comprising a plurality of system diagram. The system diagram 1310 further comprises a graphically differentiated linked graphical object 1318 and a first graphical object 1322. The second UI element 1306 comprises a list of contextually related actions 1312. The list of contextually related actions 1312 further comprises a first action text node 1334 and a second action text node 1336. The third window 1308 includes a flow chart diagram comprising a chart element 1314 and a linked chart element 1316. The input channel 1350 comprises a system diagram image 1352. The controlled memory structure 1332 comprises a branch creation logic 1330, branch merge logic 1346, image processing logic 1348, and a text node tree 1338. The text node tree 1338 comprises an action/outcome text node branch 1340. The action/outcome text node branch 1340 comprises a first text node branch 1344 and a second text node branch 1342. The input channel 1350 receives a system diagram image 1352.

Figure 14:
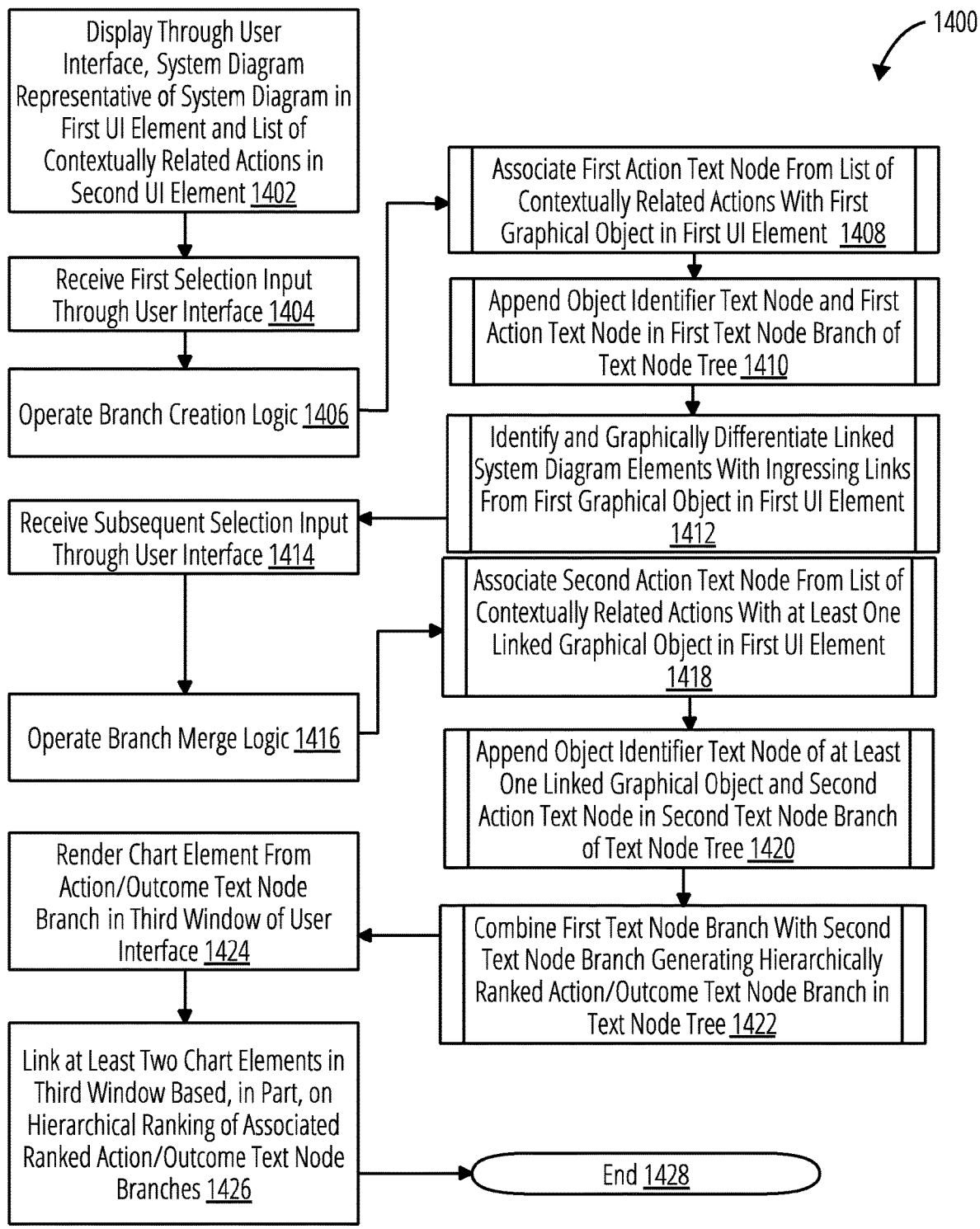
FIG. 14 illustrates an embodiment of a method of mapping actions to actors 1400.

The system for mapping actions to actors through a graphical user interface 1300 may be operated in accordance with the process described in FIG. 14.

FIG. 14 illustrates an embodiment of a method of mapping actions to actors 1400. In block 1402, the method of mapping actions to actors 1400 displays a first UI element comprising system diagram representative of a system diagram and a second UI element comprising a list of contextually related actions through a user interface. In block 1404 and block 1406, the method of mapping actions to actors 1400 operates branch creation logic, in response to receives a first selection input through the user interface. In subroutine block 1408, the branch creation logic associates a first action text node from the list of contextually related actions with a first graphical object in the first UI element through control of an associator. In subroutine block 1410, the branch creation logic appends object identifier text node of the first graphical object and the first action text node in a first text node branch of a text node tree, in a controlled memory structure, through control of a memory controller. In subroutine block 1412, the branch creation logic identifies and graphically differentiates linked system diagram elements with ingressing links from the first graphical object in the first UI element through control of a graphics processor. In block 1414 and block 1416, the method of mapping actions to actors 1400 operates branch merge logic, in response to receiving a subsequent selection input through the user interface. In subroutine block 1418 the branch merge logic associates a second action text node from the list of contextually related actions with at least one linked graphical object in the first UI element through control of the associator. In subroutine block 1420, the branch merge logic appends the object identifier text node of the at least one linked graphical object and the second action text node in a second text node branch of the text node tree, stored in the controlled memory structure, through control of the memory controller. In subroutine block 1422 the branch merge logic combines the first text node branch with the second text node branch generating a hierarchically ranked action/outcome text node branch in the text node tree through control of a combiner. In block 1424, the method of mapping actions to actors 1400 renders a chart element from an action/outcome text node branch, in a third window of the user interface through operation of the graphics processor. In block 1426, the method of mapping actions to actors 1400 links at least two chart elements in the third window based, in part, on hierarchical ranking of the associated ranked action/outcome text node branches through operation of the graphics processor. In done block 1428 the method of mapping actions to actors 1400 ends.

Figure 15:
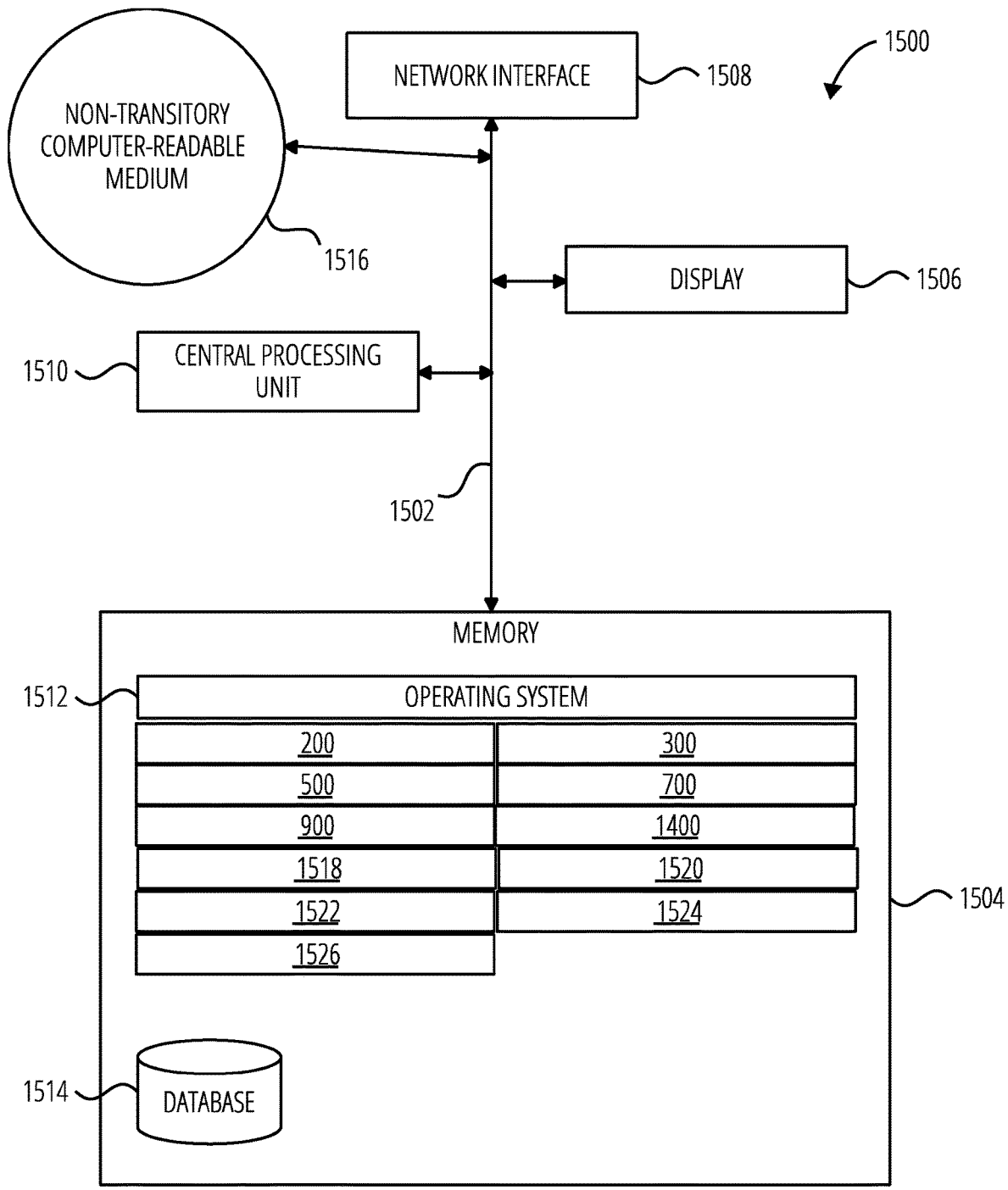
FIG. 15 illustrates a system 1500 in accordance with one embodiment.

FIG. 15 illustrates several components of an exemplary system 1500 in accordance with one embodiment. In various embodiments, system 1500 may include a desktop PC, server, workstation, mobile phone, laptop, tablet, set-top box, appliance, or other computing device that is capable of performing operations such as those described herein. In some embodiments, system 1500 may include many more components than those shown in FIG. 15. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1500 may comprise one or more physical and/or logical devices that collectively provide the functionalities described herein. In some embodiments, system 1500 may comprise one or more replicated and/or distributed physical or logical devices.

In some embodiments, system 1500 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1500 includes a bus 1502 interconnecting several components including a network interface 1508, a display 1506, a central processing unit 1510, and a memory 1504.

Memory 1504 generally comprises a random access memory ("RAM") and permanent non-transitory mass storage device, such as a hard disk drive or solid-state drive. In some embodiments, memory 1504 includes an operating system 1512, method for mapping flow chart process descriptions to system diagram graphics through a graphical user interface 200, operation of a user interface controller 300, operation of a user interface controller 500, operation of a user interface controller 700, operation of a user interface controller 900, method of mapping actions to actors 1400, an associator 1518, a branch creation logic 1520, a combiner 1522, a graphics processor 1524, and a user interface controller 1526 as logic.

These and other software components may be loaded into memory 1504 of system 1500 using a drive mechanism (not shown) associated with a non-transitory computer-readable medium 1516, such as a floppy disc, tape, DVD/CD-ROM drive, memory card, or the like.

Memory 1504 also includes database 1514. In some embodiments, system 1500 may communicate with database 1514 via network interface 1508, a storage area network ("SAN"), a high-speed serial bus, and/or via the other suitable communication technology.

In some embodiments, database 1514 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment). Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

Figure 16:
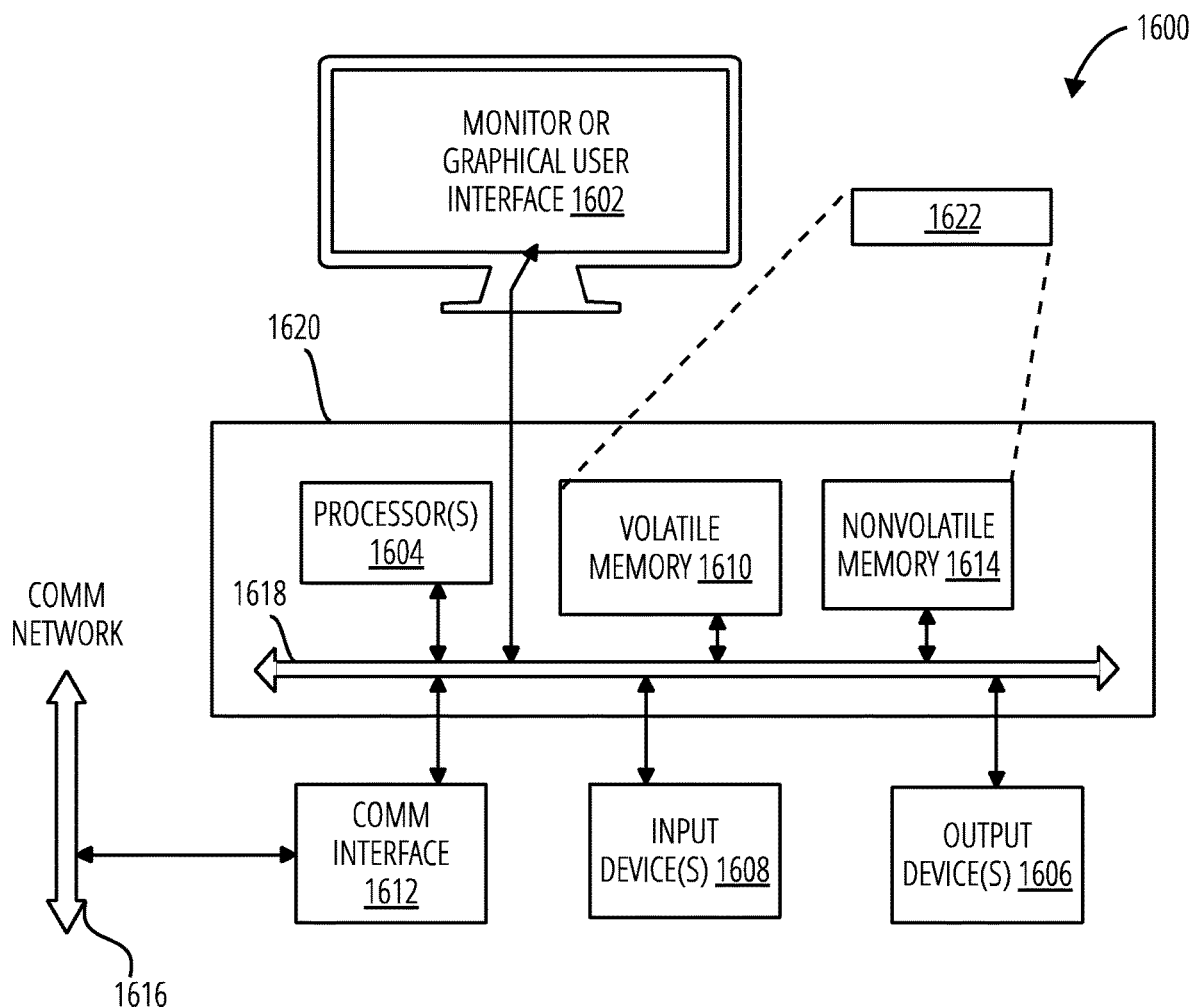
FIG. 16 is an example block diagram of a computing device 1600 that may incorporate embodiments of the present invention.

FIG. 16 is an example block diagram of a computing device 1600 that may incorporate embodiments of the present invention. FIG. 16 is merely illustrative of a machine system to carry out aspects of the technical processes described herein, and does not limit the scope of the claims. One of ordinary skill in the art would recognize other variations, modifications, and alternatives. In one embodiment, the computing device 1600 typically includes a monitor or graphical user interface 1602, a data processing system 1620, a communication network interface 1612, input device(s) 1608, output device(s) 1606, and the like.

As depicted in FIG. 16, the data processing system 1620 may include one or more processor(s) 1604 that communicate with a number of peripheral devices via a bus subsystem 1618. These peripheral devices may include input device(s) 1608, output device(s) 1606, communication network interface 1612, and a storage subsystem, such as a volatile memory 1610 and a nonvolatile memory 1614.

The volatile memory 1610 and/or the nonvolatile memory 1614 may store computer-executable instructions and thus forming logic 1622 that when applied to and executed by the processor(s) 1604 implement embodiments of the processes disclosed herein. In some embodiments, the logic 1622 may include a method for mapping flow chart process descriptions to system diagram graphics through a graphical user interface 200, operation of a user interface controller 300, operation of a user interface controller 500, operation of a user interface controller 700, operation of a user interface controller 900, method of mapping actions to actors 1400, an associator, branch creation logic, a combiner, a graphics processor, and a user interface controller.

The input device(s) 1608 include devices and mechanisms for inputting information to the data processing system 1620. These may include a keyboard, a keypad, a touch screen incorporated into the monitor or graphical user interface 1602, audio input devices such as voice recognition systems, microphones, and other types of input devices. In various embodiments, the input device(s) 1608 may be embodied as a computer mouse, a trackball, a track pad, a joystick, wireless remote, drawing tablet, voice command system, eye tracking system, and the like. The input device(s) 1608 typically allow a user to select objects, icons, control areas, text and the like that appear on the monitor or graphical user interface 1602 via a command such as a click of a button or the like.

The output device(s) 1606 include devices and mechanisms for outputting information from the data processing system 1620. These may include speakers, printers, infrared LEDs, and so on as well understood in the art.

The communication network interface 1612 provides an interface to communication networks (e.g., communication network 1616) and devices external to the data processing system 1620. The communication network interface 1612 may serve as an interface for receiving data from and transmitting data to other systems. Embodiments of the communication network interface 1612 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 1612 may be coupled to the communication network 1616 via an antenna, a cable, or the like. In some embodiments, the communication network interface 1612 may be physically integrated on a circuit board of the data processing system 1620, or in some cases may be implemented in software or firmware, such as "soft modems", or the like.

The computing device 1600 may include logic that enables communications over a network using protocols such as HTTP, TCP/IP, RTP/RTSP, IPX, UDP and the like.

The volatile memory 1610 and the nonvolatile memory 1614 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1610 and the nonvolatile memory 1614 may be configured to store the basic programming and data constructs that provide the functionality of the disclosed processes and other embodiments thereof that fall within the scope of the present invention.

Logic 1622 that implements embodiments of the present invention may be stored in the volatile memory 1610 and/or the nonvolatile memory 1614. Said software may be read from the volatile memory 1610 and/or nonvolatile memory 1614 and executed by the processor(s) 1604. The volatile memory 1610 and the nonvolatile memory 1614 may also provide a repository for storing data used by the software.

The volatile memory 1610 and the nonvolatile memory 1614 may include a number of memories including a main random access memory (RAM) for storage of instructions and data during program execution and a read only memory (ROM) in which read-only non-transitory instructions are stored. The volatile memory 1610 and the nonvolatile memory 1614 may include a file storage subsystem providing persistent (non-volatile) storage for program and data files. The volatile memory 1610 and the nonvolatile memory 1614 may include removable storage systems, such as removable flash memory.

The bus subsystem 1618 provides a mechanism for enabling the various components and subsystems of data processing system 1620 communicate with each other as intended. Although the communication network interface 1612 is depicted schematically as a single bus, some embodiments of the bus subsystem 1618 may utilize multiple distinct busses.

It will be readily apparent to one of ordinary skill in the art that the computing device 1600 may be a device such as a smartphone, a desktop computer, a laptop computer, a rack-mounted computer system, a computer server, or a tablet computer device. As commonly known in the art, the computing device 1600 may be implemented as a collection of multiple networked computing devices. Further, the computing device 1600 will typically include operating system logic (not illustrated) the types and nature of which are well known in the art.

What is claimed is:

1. A method of mapping flow chart process descriptions to system diagram graphics through a graphical user interface (UI) comprises:
   displaying a first UI element comprising a system diagram having a system diagram graphic in a first window, and a second UI element comprising a flow chart graphics object of a flow chart diagram in a second window of the graphical user interface;
   operating a user interface controller to:
      receive a first UI action control through the graphical user interface;
      receive a first UI selection control for the system diagram graphic displayed in the first UI element;
      receive a second UI selection control for the flow chart graphics object displayed in the second UI element; and
      associate the first UI selection control and the second UI selection control;
   associating component name text with the first UI selection control, resulting in a selected component name text;
   associating action/outcome text with the second UI selection control, resulting in a selected action/outcome text, wherein the action/outcome text comprises a flow chart process description associated with a process represented by the flow chart diagram;
   associating the selected component name text with the selected action/outcome text, thereby resulting in associated component name text and associated action/outcome text;
   combining the associated component name text from the first UI element with the associated action/outcome text from the second UI element to form a process description text node branch; and
   displaying the process description text node branch in a process description text window, the process description text node branch comprising the component name text and a semantically modified action/outcome text.

2. The method of claim 1, wherein the UI action control comprises a drag and drop action control configured to drag and drop the selected system diagram graphic of the first UI element onto the selected flow chart graphics object displayed in the second UI element of the flow chart diagram in the second window.

3. The method of claim 1, wherein the UI action control comprises a drag and drop action control configured to drag and drop the selected flow chart graphics object of the second UI element onto the selected system diagram graphic displayed in the first UI element of the flow chart diagram in the first window.

4. A non-transitory computer readable media comprising instructions of mapping flow chart process descriptions to system diagram graphics through a graphical user interface (UI) comprises, the instructions to operate a computer processor to:
   display a first UI element comprising a system diagram having a system diagram graphic in a first window, and a second UI element comprising a flow chart graphics object of a flow chart diagram in a second window of the graphical user interface;
   operate a user interface controller to:
      receive a first UI action control through the graphical user interface;
      receive a first UI selection control for the system diagram graphic displayed in the first UI element;
      receive a second UI selection control for the flow chart graphics object displayed in the second UI element; and
      associate the first UI selection control and the second UI selection control;
   associate component name text with the first UI selection control, resulting in a selected component name text;
   associate action/outcome text with the second UI selection control, resulting in a selected action/outcome text, wherein the action/outcome text comprises a flow chart process description associated with a process represented by the flow chart diagram;
   associate the selected component name text with the selected action/outcome text, thereby resulting in associated component name text and associated action/outcome text;
   combine the associated component name text from the first UI element with the associated action/outcome text from the second UI element to form a process description text node branch; and
   display the process description text node branch in a process description text window, the process description text node branch comprising the component name text and a semantically modified action/outcome text.

5. The non-transitory computer readable media of claim 4, wherein the UI action control comprises a drag and drop action control configured to drag and drop the selected system diagram graphic of the first UI element onto the selected flow chart graphics object displayed in the second UI element of the flow chart diagram in the second window.

6. The non-transitory computer readable media of claim 4, wherein the UI action control comprises a drag and drop action control configured to drag and drop the selected flow chart graphics object of the second UI element onto the selected system diagram graphic displayed in the first UI element of the flow chart diagram in the first window.

7. A method comprising:
   displaying a first UI element comprising a system diagram having a system diagram graphic in a first window, and a second UI element comprising a flow chart graphics object of a flow chart diagram in a second window of the graphical user interface;
   operating a user interface controller to:
      receive a first UI action control through the graphical user interface;
      receive a first UI selection control for a system diagram graphic displayed in the first UI element;
      receive a second UI selection control for the flow chart graphics object displayed in the second UI element; and
      associate the first UI selection control and the second UI selection control;
   associating component name node with the first UI selection control, resulting in a selected component name node;
   associating action/outcome node with the second UI selection control, resulting in a selected action/outcome node, wherein the action/outcome node comprises a flow chart process description associated with a process represented by the flow chart diagram;

associating the selected component name node with the selected action/outcome node, thereby resulting in associated component name node and associated action/outcome node;

combining the associated component name node from the first UI element with the associated action/outcome node from the second UI element to form a process description text node branch; and displaying the process description text node branch in a process description text window, the process description text node branch comprising the component name node and a semantically modified action/outcome node.

\* \* \* \* \*